United States Patent [19]

DeAngelis

[11] Patent Number: 4,514,268

[45] Date of Patent: Apr. 30, 1985

[54] ELECTROLYTIC AL PRODUCTION WITH REACTION SINTERED CERMET COMPONENT

[75] Inventor: Thomas P. DeAngelis, Horseheads, N.Y.

[73] Assignee: Corning Glass Works, Corning, N.Y.

[21] Appl. No.: 454,670

[22] Filed: Dec. 30, 1982

[51] Int. Cl.³ ............................................. C25C 3/06
[52] U.S. Cl. ............................ 204/67; 204/243 R; 204/290 R; 204/279; 204/291; 204/294; 264/65; 501/96
[58] Field of Search ............ 204/67, 243 R, 290 R, 204/291, 293, 294; 264/65; 501/94, 96, 98; 75/230, 236, 241, 244

[56] References Cited

U.S. PATENT DOCUMENTS

| | | | |
|---|---|---|---|
| 3,011,982 | 12/1961 | Maoluk et al. | 204/291 |
| 3,011,983 | 12/1961 | Ricker et al. | 204/291 |
| 3,037,857 | 6/1962 | Conant | 75/244 |
| 3,178,807 | 4/1965 | Bergmann | 29/182.7 |
| 3,274,093 | 9/1966 | McMinn | 204/243 |
| 3,328,280 | 6/1967 | Richards et al. | 204/243 R |
| 3,459,515 | 8/1969 | Bergmann | 29/182.8 |
| 3,690,849 | 9/1972 | Bredzs et al. | 75/244 |
| 3,856,650 | 12/1974 | Kugler et al. | 204/290 R |
| 3,877,844 | 4/1975 | Tawarada et al. | 75/230 |
| 4,333,813 | 6/1982 | Kaplan et al. | 204/243 R |
| 4,341,611 | 7/1982 | Kaplan | 204/243 R |
| 4,431,448 | 2/1984 | Merzhanov et al. | 75/236 |

FOREIGN PATENT DOCUMENTS 644066 10/1962 Belgium ............................... 204/67

Primary Examiner—Howard S. Williams
Assistant Examiner—Terryence Chapman
Attorney, Agent, or Firm—R. N. Wardell

[57] ABSTRACT

Component of electrowinning or electrorefining cell, which component in use is normally in contact with molten aluminum or in electrical contact with another component which is in contact with molten aluminum. Surface and/or inner portion of component is made of cermet body formed by reaction sintering at pressures ranging from subatmospheric to superatmospheric of reactants, which can be elements, compounds, intermetallic compounds and/or alloys, in stoichiometric proportions to substantially form 30-95 mole percent of first phase or phases being boride, carbide, nitride, silicide, sulfide or combination thereof of one or more of the elements of Groups 4b, 5b and 6b, and 5-70 mole percent of second phase or phases being aluminum, alloy or intermetallic compound thereof, or combination thereof; and the maximum grain size of the first phase or phases is substantially not greater than 10 μm. Also production cell, and method of producing aluminum in such cell, with the reaction sintered cermet component.

20 Claims, 1 Drawing Figure

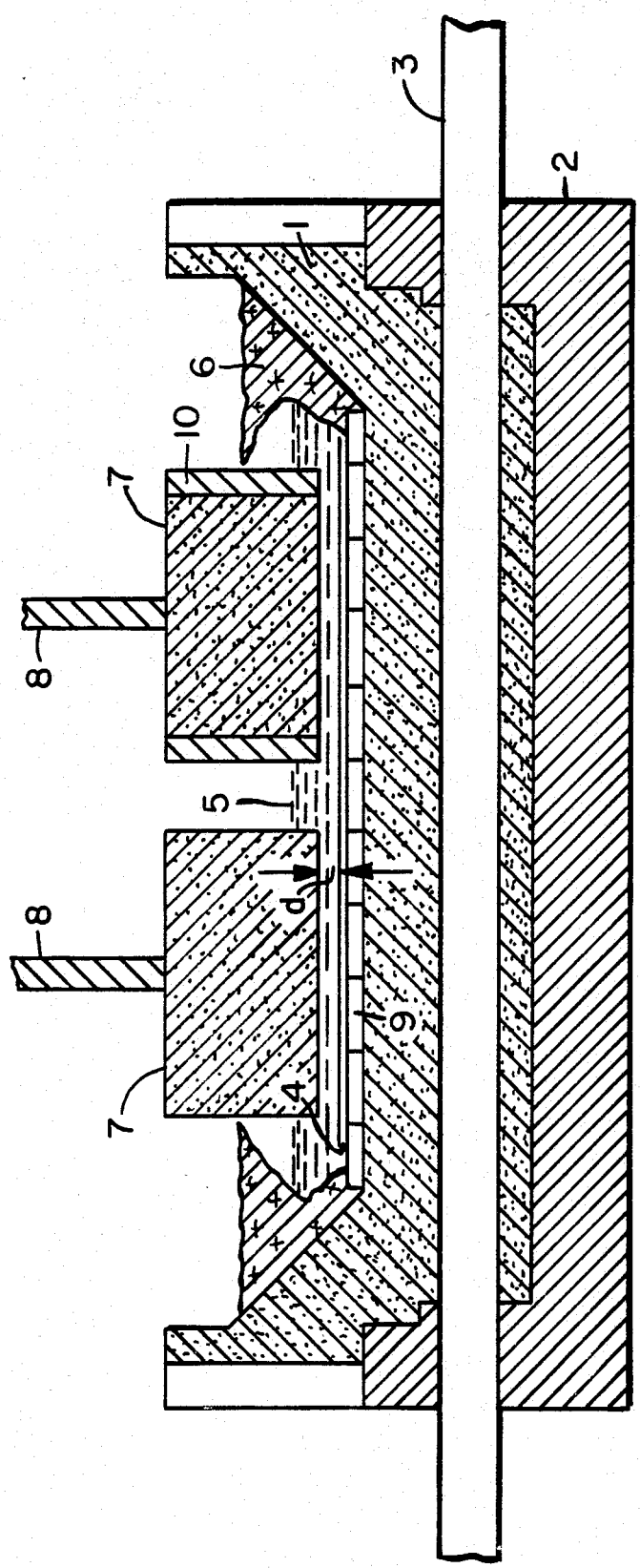

ELECTROLYTIC AL PRODUCTION WITH REACTION SINTERED CERMET COMPONENT

RELATED APPLICATION

My application titled REACTION SINTERED CERMET, Ser. No. 454,669 and concurrently filed herewith discloses and claims the cermet body and method of forming that body which forms a part of the invention claimed herein. That other application is incorporated herein by reference.

BACKGROUND OF THE INVENTION

This invention relates to cells and components thereof employed in the electrolytic production of aluminum from a fused bath, both by electrowinning and electrorefining processes, and to the aluminum production processes employing such cells and components.

Most aluminum is made by the Hall-Heroult process comprising electrolysis of alumina in a molten cryolite bath using carbon anodes and cathodes. The aluminum settles under the cryolite bath on the carbon cathode. However, the aluminum does not wet the carbon cathode and electromagnetic forces in the cell produce waves in and the humping of the molten aluminum. To ensure that the carbon cathode floor of the cell is always completely covered with aluminum, a relatively thick cathode layer, pad or pool of aluminum is maintained, which continues to be subject to waving and humping movement. The latter factor necessitates substantial anode-cathode spacing or gap to avoid shorting between the anode and the moving aluminum cathode pool. It is that spacing or gap that causes considerable electrical energy loss in the resistance heating of the cryolite-aluminum cell bath therein.

Various cell designs of drained cathodes and of cathode pool packing, baffles or weirs have been proposed to alleviate the aluminum movement and energy problem. Also, various aluminum-wettable materials and bodies have been proposed without much success for economically accomodating cell designs that can alleviate those problems. There remains the basic need for cathodes and cathode pool structures of aluminum wettable, durable bodies which can be readily and economically fabricated.

SUMMARY OF THE INVENTION

This invention overcomes the foregoing problems by providing certain components of an electrolytic aluminum production cell, which in use are normally in contact with molten aluminum or in electrical contact with other components which are normally in contact with molten aluminum, with surface and/or inner portions of the components made of reaction sintered cermet as defined herein, which is wettable by and durable in molten aluminum and cryolite as well as being electrically conductive. The invention involves not only the new components, but also the cells for and methods of producing aluminum by electrolysis, including both electrowinning and electrorefining aluminum.

In its most fundamental aspect, the invention is the aforesaid components whose surface and/or inner portions are made of a reaction sintered cermet consisting essentially of a fine-grained, homogeneous, intimate interdispersion of:

(a) 30–95 (preferably 45–95) mole percent of first phase or phases having a maximum grain size substantially (e.g. at least 95 volume percent) not greater than 10 μm and being boride, carbide, nitride, silicide, sulfide or combination thereof of one or more of the elements of Groups 4b, 5b and 6b, and (b) 5–70 (preferably 5–55) mole percent of second phase or phases being aluminum, alloy or intermetallic compound thereof, or combination thereof;

which cermet contains 0 to 4 (preferably <1) weight percent oxygen and is prepared by the process comprising:

(c) admixing particulate reactants of maximum particle size substantially (e.g. at least 95 volume percent) not greater than 150 μm and being elements, compounds, intermetallic compounds, alloys or combination thereof in stoichiometric proportions to substantially form the first and second phases, and (d) shaping and heating the admixture to form the reactive sintered cermet, the heating being done in nonreactive atmosphere and at temperature at which the reaction and sintering occurs between the reactants to substantially form the first and second phases.

Most desirably, boride constitutes the first phase or phases, especially of Group 4b elements.

Reaction sintering involves the dual effect of reaction between and sintering together of the admixed particulate reactants at temperature causing the reaction to occur and be substantially completed. It may be effected at atmospheric, subatmospheric or superatmospheric pressure. The latter condition involves the substantially simultaneous shaping and heating steps of hot pressing to produce a cermet component of the invention with very little or no open porosity and highest strength properties, although some preliminary separate pressing or heating of the reactant admixture may be advantageously done. Where open porosity is desired in an otherwise tough and hard cermet component of the invention, the separate heating step at atmospheric or subatmospheric pressure may be employed sequentially following the shaping step.

Of course, reaction temperature is governed by the particular reactants and their identified reaction temperature at whatever pressure is selected for performing the heating step.

An especially unique cermet component of the invention has very fine grain sizing and thickness of the layer of aluminum and/or its alloy and/or intermetallic compound at least partially separating the grains of nonoxide ceramic phase. The latter layer thickness is generally not greater than 1 μm and, for best strength and deformation resistance, it is less than about 1000 Å. Desirably the mean grain size of the first or nonoxide ceramic phase or phases is not greater than 6 μm and the mean particle size of the reactants is less than 100 μm.

The component of the invention may contain, as part of the first and/or second phase, diluent which is a nonreacted portion of the reactant admixture as a stoichiometric excess amount of a reactant and/or as a metal, alloy, intermetallic compound or nonoxide ceramic compound according to the aforesaid invention definition but different than the reactants.

BRIEF DESCRIPTION OF THE DRAWING

The sole FIGURE is a schematic, vertical cross-sectional view of an aluminum electrowinning cell incorporating components comprising the composite body in accordance with the invention.

DETAILED DESCRIPTION

The invention will be illustrated by reference to one exemplary type of production cell and process, but it is capable of being adapted to other types of electrolytic aluminum production cells and processes, including electrorefining.

The sole FIGURE schematically shows a cell comprising a carbon liner and cathode base 1 in a heat-insulating shell 2 and with a cathode current collector or bar 3 embedded in the liner 1. Within the liner 1 is a shallow or thin cathodic layer or film 4 of molten aluminum and an alumina-containing molten cryolite electrolyte 5 at a temperature of 940°-1000° C. This electrolyte commonly consists of sodium cryolite ($Na_3AlF_6$) as the major component plus about 4-10 wt.% calcium fluoride, about 2-10 wt.% aluminum fluoride and about 2-8 wt.% alumina. However, as desired, the electrolyte may be of other alumina-containing compositions. The aluminum layer 4 and molten electrolyte 5 are surrounded by a crust or frozen layer or "freeze" 6 of the solidified electrolyte. Anodes consisting of prebaked blocks of carbon 7, which are suspended by anode current feeders 8, dip into the molten electrolyte 5 above the shallow aluminum layer or film 4, with a spacing d being maintained thin enough to avoid significant waving or humping therein, e.g. between the bottom of blocks 7 and the top of the thin layer or film 4. Commonly commercial cells have several rows of pairs of anodes 7. Blocks 7 are generally of the same size in each cell. Such size can range from about $60 \times 40 \times 40$ cm for small cells to about $150 \times 100 \times 70$ cm for large cells. Operating anode current density is usually between 6 and 10 $kA/m^2$.

The carbon cathode base 1 has its upper surface, which faces anode blocks 7, covered by a cathode layer 9 of slabs, segments or plates positioned either closely together or in spaced relation to allow the molten aluminum formed as film 4 on layer 9 to drain continuously off of the top of layer 9 into suitable reservoir or collection basin (not shown). The segments of layer 9 can be either fastened to the carbon base 1 (e.g. by pegs of carbon or the material of layer 9) or merely placed thereon, with mating surfaces providing good electrical contact as needed. These segments of layer 9 (or surface portion thereof) are one of the components desirably formed of reaction sintered cermet according to the invention. Such segments, plates or slabs of the reaction sintered cermet can be about 0.5-5 cm thick e.g. approximately 2.5 cm. They can be of any suitable length, width and geometric shape. For convenience of manufacture and installation, the slabs can be made with length and width dimensions in the range of about 5-15 cm, e.g. about 10 cm., for square or hexagonal shapes.

By using this layer 9 of the cermet plates of the invention as an operative aluminum-wettable surface in contact with the cathodically collected molten aluminum, layer 4 of such molten aluminum can be easily maintained as a thin film typically less than about 1 mm or as a shallow layer of desired constant thickness, e.g. up to about 1 cm, if appropriate weirs or restraining means (not shown) are used at edges of layer 9 (which may also be formed of the cermet according to this invention). In either case, no significant waving or humping occurs in the thin aluminum layer 4 and the distance d can be greatly and reliably minimized, e.g. to about 2 to less than 3.8 cm, to reduce electrical energy loss.

Further electrical energy savings may be achieved when even further portions of cell lining 1 are also constructed of the cermet components of the invention. Even the cathode current collector 3 (or inner portion therof) may be formed of those cermet components.

If carbon anodes 7 are employed, their position with respect to the desired spacing d can be adjusted as the blocks 7 wear away, with computer-controlled anode feed devices maintaining the gap d relatively constant. Alternatively, the carbon anode 7 can be replaced with oxygen-evolving anodes that remain relatively dimensionally stable, in which case the cell may be operated at higher current densities up to 20-50 $kA/m^2$. Optionally these anodes 7 may have a protective and/or reinforcing casing 10, e.g. of alumina, to reduce the rate of wear and loss of carbon blocks 7.

In producing aluminum in the cell shown in the drawing, additional alumina is fed into the electrolyte 5 as it becomes depleted of alumina by its electrolytic reduction to aluminum which settles onto and drains off of layer 9 in conventional manner.

COMPONENT PREPARATION

It is believed that reaction sintering relies on the reaction having a substantial negative heat of formation as the driving force for the reaction. The products or components formed must have lower free energy of formation than the reactants from which they were prepared. The elements of the groups of the Periodic Table as recited in the description of the invention are selected for the invention body so as to conform to these principles.

Reaction sintering is initiated by heating the shaped mixture. At the reaction initiation temperature, the reactants begin to react and liberate a substantial amount of heat. This exotherm causes a sharp temperature rise in the reactant powder mixture. It is believed that this rapid temperature rise permits rapid diffusion of the reactants within the mixture, which causes either hot pressing compaction or sintering shrinkage under atmospheric or subatmospheric pressure as well as further chemical reaction to occur quickly. The reaction initiating temperature is generally much lower than the temperature necessary to attain a dense body by conventional hot pressing or separate pressing and sintering of preformed phase ingredients where no reaction occurs. This is particularly beneficial in this invention where higher temperatures may be deleterious to the metal phase.

Several processing parameters may be adjusted to optimize the conduction of the reaction sintering and the properties of the resultant cermet body. Some of these parameters are: type, purity and surface area of the particulate reactants; stoichiometry of the reactant mixture; pretreatment of the reactants, rate of heating; post heating treatments; and geometry of the body of component.

Reaction sintering of admixtures according to this invention produces components or bodies with the nonoxide ceramic compound phase or phases having very small grain size, generally about one order of magnitude smaller than the particle size of the starting reactant powders. The reaction sintered cermet bodies can be easily prepared with maximum grain sizes of the nonoxide ceramic compound phase or phases being substantially (e.g. at least 95 volume percent) not greater than 5 $\mu$m (preferably 2 $\mu$m) or even less with mean grain sizes of such phase or phases being less than 1 μm. These very fine grain sizes can be attained by using reactants with maximum particle sizes substantially (e.g. at least 95 volume percent) not greater than 44 μm or with mean particle sizes less than about 20 μm. Grain growth is usually not experienced because the components or bodies can be made at significantly lower temperatures with shorter hold times at heating temperature than by conventional nonreactive manufacturing techniques. Achieving such small grain sizes is often difficult if not impractical to accomplish using conventional nonreactive techniques because many preformed phase powders are not readily available in such small particle size of less than 5 μm.

Generally the particulate reactants are mixed in the stoichiometric proportions to form the desired product phases. For example, the following molar proportion formula describes exemplary reaction mixture and product phases:

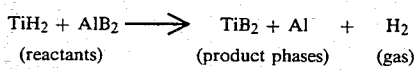

$$TiH_2 + AlB_2 \longrightarrow TiB_2 + Al + H_2$$
(reactants) (product phases) (gas)

However, nonstoichiometric proportions may be used in order to vary the properties of the product or to control the reaction process. Powdered diluent material may also be added to the reactant mixture. The diluent may be or contain one of the elements of the reactants or may be the same as one of the reaction-produced phases in the products or may be other suitable material, any of which may be used to control the reaction sintering or properties of the resultant product. The amount of diluent or diluents must be less than that amount which would prevent the reaction sintering from taking place.

The reactants can be mixed or blended in any suitable manner known to those skilled in ceramic technology for yielding an intimate, homogeneous mixture or reactant particles, e.g. by ball milling in dry or wet condition.

For very dense products, the hot pressing procedure, including hot isostatic pressing, is employed. The mixed reactants are charged into a mold. If desired, those reactants may be given pretreatments such as dehydration, degassing or burn-out of binder, provided the pretreatment temperature is kept below the reaction initiation temperature. It is advantageous to precompact the reactant mixture at room temperature and at 50–100% of hot pressing pressure to ensure a uniformly compacted product after hot pressing. This was routinely done in making samples of the invention. For common hot pressing with a mold comprising an annular die with upper and lower plungers, the mold for precompaction (and even pretreatment) is preferably the same one used in subsequent hot pressing. The mold can be of any material not adversely reactive with the reaction mixture and that can withstand desired pressures up to 15,000 psi (about 1055 kg/cm$^2$) or more. Graphite molds have been found very suitable for pressures up to 10,000 psi (about 700 kg/cm$^2$) and were exclusively used in making the samples of the invention. At least the precompaction pressure is usually applied to the charged mold and a suitable atmosphere is provided to completely contact the charged mold before heating is begun to effect reaction hot pressing. A moderate vacuum (e.g. about $1 \times 10^{-4}$ Torr) was satisfactorily employed in making the samples of the invention; however, inert gas atmosphere may also be employed for the same purpose of protecting the reactants and the mold from adverse air oxidation. As necessary, the pressure is increased to the full load during heating to or at the maximum hot pressing temperature. To assure good body density, full pressure should be at least 2000 psi (about 140 kg/cm$^2$). Heating can be done in any suitable hot pressing furnace, such as an induction heating furnace or electric resistance heating furnace used to make samples of the invention, which provides very rapid heat-up. Heating rates satisfactorily employed ranged between 9° and 25° C./minute, the slower rates being used with reactant mixtures evolving hydrogen that is drawn off by the vacuum system. Heating progresses to a temperature at which the reaction sintering is initiated. That event is marked by a rapid temperature rise in the mold due to exothermic heat evolution from the reaction. When the maximum temperature and pressure for the reaction hot pressing are attained, they are usually held for at least some short period to assure complete reaction sintering, e.g. about 1–2 hours for products ranging between 1.5–3 inches (about 3.8–7.6 cm) in diameter and about 0.2–0.5 inch (about 0.5–1.3 cm) thick as in the cases of the samples made of the invention. Thereafter, the molds containing the samples are cooled in the furnace under protective atmosphere at furnace cooling rate and the pressure is held on the samples until they were cooled to about room temperature. Then the molds are removed from the furnace and the samples are pressed out of the annular mold body.

In making larger size components of the invention (e.g. 4 inches or about 10 cm diameter $\times$ 1 inch or 2.5 cm thick) containing hydride reactant, it is desirable to precompact the reactant mixture and heat that compact in a vacuum furnace where the compact is merely supported by a setter in order to safely remove the larger volume of hydrogen. This heating is done at about 650° C. for TiH$_2$ and the heating period is sufficient to remove the hydrogen, e.g. 5–6 hours for one or two compacts and as long as 2 days for about 28 compacts heated at one time. Thereafter, these pretreated compacts are cooled to room temperature, removed from the vacuum furnace and then reaction sintered as previously described.

For components of less density, the reactant mixture can be fully compacted or shaped at room temperature generally at pressures up to 60,000 psi (about 4.2 tons/cm$^2$) or more, but preferably between $10-50 \times 10^3$ psi (about 0.7–3.5 tons/cm$^2$), to yield a green (i.e. unfired) body, which is subsequently sintered at atmospheric pressure. Preforming of the green body can be done by any suitable ceramic fabrication process, e.g. dry or wet pressing, isostatic pressing, slip casing, extrusion, injection molding, doctor blading, etc.

The cermet components of this invention are very durable in contact with molten aluminum and cryolite, e.g. resistant to corrosion/erosion in aluminum cathode pools. Generally they are very refractory and thermal shock resistant. They are also electroconductive by virtue of low electrical resistivity. They are relatively wear-resistant and hard. They also exhibit good strength and excellent toughness. In their more porous form, they may serve, for example, as diaphragms or other components of electrolytic aluminum production cells.

BODIES A AND B

The following two bodies are an exemplary comparison of a reaction hot pressed cermet body and a conventionally nonreaction hot pressed cermet body. Both had batch mixtures formulated to give 1:1 molar ratio of $TiB_2$ and aluminum metal phases in those bodies.

Body A of the invention was formed in accordance with the previous molar formula as follows: The batch components consisted of 50.7 wt.% $TiH_2$ powder of 2.4 $\mu m$ mean particle size (mps) and 49.3 wt.% $AlB_2$ powder of 18.5 $\mu m$ mps and containing a small amount of free aluminum. The $TiH_2$ powder contained 3.23 wt.% oxygen and 0.02 wt.% carbon as impurities. The $AlB_2$ powder contained 1.37 wt.% oxygen and 0.2 wt.% carbon as impurities. These reactants were dry mixed without binder in a revolving plastic jar with alumina balls. The reactant mixture was hot pressed in a graphite mold and in vacuum at a maximum reaction sintering temperature of 1100° C. at 6000 psi (421.8 kg/cm²) for 2 hours. During heating, the $TiH_2$ substantially decomposed at temperatures in the range of about 400°–500° C. The $AlB_2$ substantially decomposed as the temperature advanced from about 650° C. to about 900° C. and beyond. An intermediate or transitory phase formation of aluminum-titanium alloy apparently formed and was then consumed in further reaction as the temperature progressed through the range of about 700°–1100° C. The reaction was completed at 1100° C.

Body B not of the invention was formed as follows: The batch components consisted of 72 wt.% $TiB_2$ powder of 3.2 $\mu m$ mps and 28 wt.% aluminum powder of 43 $\mu m$ mps. The $TiB_2$ powder contained 0.36 wt.% oxygen, 0.26 wt. carbon and 0.02 wt.% nitrogen. The aluminum powder containeld 0.096 wt.% oxygen, 0.005 wt.% carbon and 0.01 wt.% nitrogen. These nonreactive components were wet mixed with trichlorethane in a revolving plastic jar with alumina balls. The nonreactive mixture was hot pressed in the same manner as for Body A except the time period was only 1 hour.

The comparative properties of Bodies A and B are set forth in Table 1. Note 1: (M) indicates major phase peaks, (m) indicates minor phase peaks and (T) indicates trace phase peaks. Note 2: N.D. indicates that property was not determined. Note 3: A nonreaction hot pressed body of 75 wt.% $TiB_2$ and 25 wt.% Al exhibited deformation starting at about 700° C. under 50 psi (3.5 kg/cm²) load in air. Note 4: Lack of deformation @1100° C. was observed on a ⅛×⅛×2 inch (3.2×3.2×50.8 mm) test bar; however, deformation was observed between about 670°–700° C. on other ⅛×⅛×3 inch (3.2×3.2×76.2 mm) test bars of similar composition, but having $TiB_2$ phase grain size of mostly 1–2 $\mu m$, under load of 250 psi (17.6 kg/cm²). Note 5: No further oxidation at 1050° C. occurred up to 180 hours; whereas a hot pressed sample of only $TiB_2$ exhibited oxidation of about 20 mg/cm² after 180 hours at 1050° C. in air with continuing oxidation expected.

In Body A, the very small (mostly on the order of 0.1–0.5 $\mu m$) $TiB_2$ grains are intimately interdispersed with and separated by thin layers of aluminum metal, which are estimated to be less than about 1000 Å thick in this dense body. $TiB_2$ grains frequently appear as plate-like particles under scanning transmission electron microscopy, the smallest of which is about 0.05 $\mu m$ wide.

TABLE 1

|  | Body A | Body B |
| --- | --- | --- |
| x-ray phases (see Note 1) | $TiB_2$ (M) | $TiB_2$ (M) |
|  | Al (m) | Al (m) |
|  | $Al_2O_3$ (T) | Unknown (T) |
| Al, wt. % | 23.7 | 21.6 |
| Ti, wt. % | 46.3 | 52.1 |
| $O_2$, wt. % | 1.7 | 1.05 |
| C, wt. % | 0.2 | 0.21 |
| $N_2$, wt. % | 0.1 | 0.006 |
| $TiB_2$ phase grain size, mostly $\mu m$ | ≦2 <1 | ≧3.2 |
| Density, g/cc | 3.6 | 3.4 |
| Open porosity, % | 0 | 10.5 |
| Modulus of rupture @ 20° C., psi × 10³ | 55.1 | 43.9/48.8 |
| (tons/cm²) | 3.87 | (3.09) |
| Young's Modulus @ 20° C., psi × 10⁶ | 35.6 | 23.9 |
| (ton/cm² × 10³) | 2.50 | (1.66) |
| Shear Modulus @ 20° C., psi × 10⁶ | 14.8 | 9.9 |
| (tons/cm² × 10³) | 1.04 | (0.70) |
| Poisson's ratio @ 20° C. | 0.200 | 0.198 |
| Beam bend deformation: |  |  |
| 50 psi (3.5 kg/cm²) load @ 1200° C. in air | None | See note 3 |
| approx. 440 psi (30.9 kg/cm²) load @ 1100° C. in argon | None | N.D. |
|  | See note 4 | See note 2 |
| Rockwell C hardness | 42 | <10 |
| Knoop hardness | 400 | N.D. |
| Electrical resistivity, $\mu\Omega$-cm in argon: |  |  |
| 25° C. | 10.2 | 14.8 |
| 250° C. | 14.5 | N.D. |
| 500° C. | 28.2 | N.D. |
| 750° C. | 50.1 | N.D. |
| 1000° C. | 63.1 | N.D. |
| Oxidation, mg/cm²: |  |  |
| 1000° C. for 48 hours in air | <2.5 | N.D. |
| 1050° C. for 30 hours in air/approx. 4 | See note 5 | N.D. |
| Thermal shock |  |  |
| 1050° C. → 20° C. in air | No crack | N.D. |
| 20° C. air → 1000° C. molten Al → 20° C. air | No crack | N.D. |

Body A and other reaction sintered, cermet components of this invention were found to be extremely tough. They were cut with a diamond saw only with extreme difficulty and were not polished easily with either diamond or SiC. Electric discharge machining (EDM), e.g. with a wire electrode, or electrochemical machining were found useful for cutting these new materials.

In relation to most glasses and ceramics, these new reactiom sintered cermets exhibit some ductility under mechanical loading. Such bodies have been dented by impact loads insufficient to cause fracturing thereof. Also gradually applied loads short of causing fracture failure have resulted in indications of some permanent inelastic or plastic deformation in a test piece of Body A. Presumably the presence of the metal phase provides such limited but notable ductile character to such bodies.

Body A was tested for suitability for use as a component, e.g. cathode or cathode current collector, in an electrolytic aluminum production cell. In a cathode pool test, a sample of Body A were merely placed submerged (but not connected at the cathode) in the molten aluminum cathode pool of a laboratory test cell operated at about 1000° C. for 10 hours with anode and cathode current density of about 0.5 A/cm². In a hanging cathode test, a sample of Body A was suspended and connected as the cathode extending into the representative molten cryolite-aluminum bath of the laboratory test cell operated as noted above. In a commercial cell test, a sample of Body A was merely placed submerged (but not connected as the cathode) in the molten aluminum cathode pool of a 60,000 ampere Hall Heroult cell for 2 weeks and also for 4 weeks. In all these tests, the molten aluminum wetted the sample, and the sample exhibited no significant corrosion, erosion or dimensional change except for some slight surface layer exfoliation (only about 50 μm thick) in a few areas. In contrast, bodies somewhat similar in composition (TiB$_2$:Al molar ratio of 75:25) and generally similar in method of formation to that of Body B exhibited substantial corrosion/erosion in cathode pool and commercial cell tests, i.e. corners were rounded and moderate-to-severe erosion of grains from the surface thereof occurred.

By modifying the phase ratio TiB$_2$:Al of Body A, the properties may be tailored to more desired values. The ratio modification can be attained by adjusting the proportions to the TiH$_2$ and AlB$_2$ reactants or by adjusting the hot pressing pressure and/or temperature to higher or lower levels that respectively cause more of less liquid aluminum phase to be squeezed out of a body during hot pressing. The latter effect is especially applicable to reaction hot pressed bodies according to the molar formula:

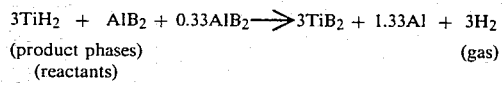

$$3TiH_2 + AlB_2 + 0.33AlB_2 \longrightarrow 3TiB_2 + 1.33Al + 3H_2$$
(reactants) (product phases) (gas)

where the pressure can range between 4000–6000 psi (about 281–422 kg/cm$^2$). In either case, as the phase ratio TiB$_2$:Al increases, there will likely be an increase in property values such as density, modulus of rupture, Young's Modulus, hardness and electrical resistivity (because aluminum is more electrically conductive than TiB$_2$).

BODIES C AND D

Two reaction hot pressed bodies were prepared according to the molar formula:

$$Ti + AlB_2 \rightarrow TiB_2 + Al$$

from a reactant mixture of 49.7 wt.% Ti powder and 50.3 wt.% AlB$_2$ powder. Their other process parameters and properties are set forth in Table 2.

TABLE 2

|  | Body C | Body D |
|---|---|---|
| Ti powder mps, μm | 4.9 | 41 |
| AlB$_2$ powder mps, μm | 10.5 | 10.5 |
| Hot pressing - |  |  |
| Temperature, °C. | 1100 | 1150 |
| Pressure, psi | 4000 | 3000 |
| (kg/cm$^2$ | 281 | 211) |
| Time @ Temp., hours | 1 | 0.5 |
| TiB$_2$ phase grain size, μm | 0.5–2 | 3–11 |
|  | (1.25 mean) | (7 mean) |
| Density, g/cc | 3.60 | 3.15 |
| Open Porosity, % | 0.2 | 2.0 |
| Young's Modulus @ 20° C., psi × 10$^6$ | 33.4 | 31.2 |
| (tons/cm$^2$ × 10$^3$ | 2.35 | 2.19) |
| Maximum temperature without beam bend deformation under 440 psi (30.9 kg/cm$^2$) load in argon, °C. (*two separate tests) | *700 *950 | 600 |
| Cathode Pool Test | Very very slight edge erosion | Severe grain erosion |

The powder particle size and TiB$_2$ phase grain size data of Bodies C and D illustrate an observed trend in many reaction sintered cermet bodies of this invention, viz. the particle size of the powder containing the metal element which forms the nonoxide ceramic phase generally governs, in a direct proportional manner, the grain size of the nonoxide ceramic phase.

The data of Bodies C and D regarding TiB$_2$ phase grain size and Cathode Cell Test results also show the need for the reaction sintered cermet to have a mean grain size of the nonoxide ceramic phase being not greater than 6 um to provide good erosion resistance to cathodic molten aluminum.

BODY E

A cermet example of the invention employing an intermetallic compound reactant was made according to the following molar formula:

$$TiAl + 2B \rightarrow TiB_2 + Al$$

Thus, Body E was prepared from a reactant mixture consisting of 77.3 wt.% TiAl powder of 33 μm mps and 22.7 wt.% boron powder of 94 μm mps. After mixing like Body A and hot pressing at the maximum temperature of 1450° C. and pressure of 6000 psi (421.8 kg/cm$^2$) for 1 hour, the reaction sintered body had: phases of TiB$_2$(M) and Al(m), estimated TiB$_2$ grain size less than 2 μm, 13.7 wt% Al, 53.7 wt.% Ti, a density of 3.95 g/cc, 0% open porosity, Young's Modulus of 54.96×10$^6$ psi (3.864×10$^3$ tons/cm$^2$), electrical resistivity at 20° C. of 17.0 μΩ-cm and Rockwell A hardness of 86.5. This body is wettable by molten aluminum and is durable in molten aluminum and cryolite.

BODY F

As an example of employing a diluent in a reactant mixture of this invention and of bonding preformed phase material together by a reactant mixture of this invention, Body F was formed in accordance with the following molar formula:

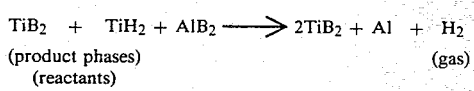

$$TiB_2 + TiH_2 + AlB_2 \longrightarrow 2TiB_2 + Al + H_2$$
(reactants) (product phases) (gas)

The reactant mixture consisted of 41.3 wt.% TiB$_2$ powder of 3.2 μm mps, 29.7 wt.% TiH$_2$ powder of 28 μm mps and 29.0 wt.% AlB$_2$ powder of 9.2 μm mps. Mixing was done in the same manner as for Body B, except that 4 wt.% Carbowax binder was added. The binder was burned out of the reaction mixture at 350° C. for 2 hours in air. Hot pressing was performed in the same manner as for the previous bodies, but at a maximum reaction sintering temperature of 1500° C. and at 5000 psi (351.5 kg/cm$^2$) for 2 hours. The resulting phases were TiB$_2$(M), Al(m) and Ti$_2$B$_5$(T). The grain size of the boride phases was less than 10 μm. Density was 3.93 g/cc. Open porosity was 2.4%. The body was extremely tough and had a modulus of rupture at 20° C. of 43,300 psi (30.4 tons/cm$^2$). Electrical resistivities were 22.4 μΩ-cm at 25° C. and 120.2 μΩ-cm at 1000° C. Samples of Body F tested in the cathode pool test and hanging cathode test showed no dimensional change and no corrosion.

BODY G

Other boride-metal reaction sintered cermets for the invention can be formed by appropriate choice of reactants. For example, Body G was formed according to the molar formula:

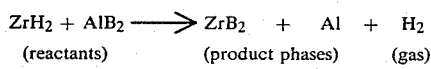

The reactant mixture consisted of 34.3 wt.% AlB$_2$ of 18.5 $\mu$m mps and 65.7 wt.% ZrH$_2$ of 1–3 $\mu$m mps. Mixing was done the same as for Body B. Similar reaction hot pressing was performed at 1200° C. and 5000 psi (351.5 kg/cm$^2$) for 2 hours. The resulting phases were: ZrB$_2$(M), Al(m) and unknown phase(T). The grain size of the boride phase was less than 5 $\mu$m. Density was 2.6 g/cc. Open porosity was 35.7%. Impurities were: 2.0 wt.% O$_2$, 0.14 wt.% C and 0.14 wt.% N$_2$. Young's Modulus was $8.6 \times 10^6$ psi (605 tons/cm$^2$). Shear Modulus was $3.8 \times 10^6$ psi (267 tons/cm$^2$). Poisson's ratio was 0.158. Electrical resistivity at 20° C. was 30.2 $\mu\Omega$-cm. A Sample of Body G tested in the cathode pool test showed no significant dimensional changes, although slight erosion of grains occurred at some corners of the sample, presumably due to the unusually high porosity of this particular body.

BODIES H-1 AND H-2

Two bodies of the invention were formed by reaction sintering after the reactant mixture was first fully shaped (i.e. without hot pressing). A reactant mixture the same as for Body A was wet mixed in the same manner was in the mixing for Body E. That mixture was isostatically pressed at 50,000 psi into two green bodies and the resultant green bodies were heated at 300° C. in air to burn out the wax binder. Then those bodies were fired at 100° C./hr. in argon to the maximum reaction sintering temperature: one body at 1200° C. and the other at 1500° C. After 6 hours at those temperatures, the bodies were cooled at 100° C/hr. in argon. The resultant cermet bodies were hard but porous with the following characteristics:

| Body: | H-1 | H-2 |
|---|---|---|
| Maximum temperature: | 1200° C. | 1500° C. |
| | TiB$_2$ (M) | TiB$_2$ (M) |
| | Al (m) | Al (m) |
| | Al$_2$O$_3$ (T) | |
| TiB$_2$ phase grain size, $\mu$m | $\leqq 2$ | $\leqq 2$ |
| Density, g/cc | 1.82 | 2.05 |
| Open porosity, % | 42.3 | 37.1 |
| Oxygen impurity, wt. % | 2.3 | 2.0 |

These electrically conductive bodies can be employed as a cell component such as key 24 as shown in FIGS. 1a through 2 of U.S. Defensive Publication T993,002 of Apr. 1, 1980, which is incorporated herein by reference.

Other reaction sintered cermet bodies (with or without hot pressing as desired) can be formed by appropriately selecting other reactant mixtures within the invention definition. The following molar formula are illustration of such other selections:

TiH$_2$+Al+2B→TiB$_2$+Al+H$_2$
3TiH$_2$+AlB$_2$+0.3AlB$_{12}$→3TiB$_2$+1.3Al+3H$_2$
3TiH$_2$+7Al+6B→3TiB$_2$+7Al+3H$_2$
3TiH$_2$+3AlB$_2$+4Al→3TiB$_2$+7Al+3H$_2$
NbH$_2$+AlB$_2$→NbB$_2$+Al+H$_2$
Cr+AlB$_2$→CrB$_2$+Al
Al$_4$C$_3$+7Ti→3TiC+4TiAl
Al+2BN+4Ti→TiB$_2$+2TiN+TiAl
AlSi$_2$+Ti→TiSi$_2$+Al
Al$_2$S$_3$+3Ce→3CeS+2Al

Components according to the invention can advantageously substitute for the cell components of boride, carbide, nitride or silicide (or refractory hard metal—RHM) as disclosed in U.S. Pat. Nos. 2,915,442, 3,028,324, 3,156,639, 3,161,579, 3,215,615, 3,274,093, 3,287,247, 3,330,756, 3,400,061, 3,930,967, 4,071,420, 4,093,524, 4,118,292, 4,177,128, 4,224,128, 4,231,853, 4,243,502, 4,333,813, 4,338,177, 4,339,316, 4,341,611, 4,342,637 and 4,349,427, in U.S. Defensive Publication T993,002 (of a patent application) dated Apr. 1, 1980, and PCT published patent application No. WP-8102170, all of which documents are incorporated herein by reference.

I claim:

1. A component of an electrolytic aluminum production cell which in use is normally in contact with molten aluminum or in electrical contact with another component which is normally in contact with molten aluminum, characterized in that it has a portion made of a fine-grained, homogeneous, intimate interdispersion of:
   (a) 30–95 mole percent of first phase or phases having a maximum grain size not greater than about 10 $\mu$m and being boride, carbide, nitride, silicide, sulfide or combination thereof of one or more of the elements of Groups 4b, 5b and 6b, and
   (b) 5–70 mole percent of second phase or phases being aluminum, alloy or intermetallic compound thereof, or combination thereof;
   which cermet contains 0 to 4 weight percent oxygen and is prepared by the process comprising:
   (c) admixing particulate reactants of maximum particle size substantially not greater than 150 $\mu$m and being elements, compounds, intermetallic compounds, alloys or combination thereof in stoichiometric proportions to substantially form the first and second phases, and
   (d) shaping and heating the admixture to form the reactive sintered cermet, the heating being done in nonreactive atmosphere and at temperature at which the reaction and sintering occurs between the reactants to substantially form the first and second phases.

2. The component of claim 1 which is prepared by the shaping and heating being separate sequential steps.

3. The component of claim 1 which is prepared by the shaping and heating being substantially simultaneous steps of hot pressing.

4. The component of claim 1 wherein the mean grain size of the first phase or phases is not greater than 6 $\mu$m and the mean particle size of the reactants is less than 100 $\mu$m.

5. The component of claim 4 wherein the maximum grain size of the first phase or phases is not greater than about 5 $\mu$m and the maximum particle size of the reactants is not greater than about 44 $\mu$m.

6. The component of claim 5 wherein the maximum grain size of the first phase or phases is not greater than about 2 $\mu$m.

7. The component of claim 6 wherein the mean grain size of the first phase or phases is less than 1 $\mu$m.

8. The component of claim 1 having the first phase or phases being boride of one or more of the elements of Groups 4b, 5b and 6b, and having the second phase being Al.

9. The component of claim 8 having the first phase or phases being diboride of one or more of the elements of Group 4b.

10. The component of claim 1 having 45–95 mole percent of the first phase or phases and 5–55 mole percent of the second phase or phases.

11. The component of claim 10 which is prepared by the shaping and heating being substantially simultaneous steps of hot pressing.

12. The component of claim 11 wherein the mean grain size of the first phase or phases is not greater than 6 $\mu$m and the mean particle size of the reactants is less than 100 $\mu$m.

13. The component of claim 12 having the first phase or phases being boride of one or more of the elements of Groups 4b, 5b and 6, and having the second phase being Al.

14. The component of claim 13 wherein the maximum grain size of the first phase or phases is not greater than about 2 $\mu$m.

15. The component of claim 14 wherein the mean grain size of the first phase or phases is less than 1 $\mu$m.

16. The component of claim 15 having the first phase or phases being diboride of one or more of the elements of Group 4b.

17. The component of claim 16 wherein the Al at least partially separating the grains of diboride is in thin layers less than about 1000 Å.

18. The component claim 17 having a first phase of $TiB_2$.

19. An electrolytic aluminum production cell comprising one or more components as claimed in claim 1.

20. In a method of producing aluminum by electrolysis in an electrowinning or electrorefining cell the improvement characterized by using a cell component as claimed in claim 1.

* * * * *

UNITED STATES PATENT AND TRADEMARK OFFICE
CERTIFICATE OF CORRECTION

PATENT NO. : 4,514,268
DATED : April 30, 1985
INVENTOR(S) : Thomas P. DeAngelis

It is certified that error appears in the above-identified patent and that said Letters Patent is hereby corrected as shown below:

Col. 3, lines 26-28, the words "thin enough to avoid significant waving or humping therein, e.g." should be omitted.

Col. 3, line 59, after "maintained", insert -- thin enough to avoid significant waving or humping therein, e.g. --.

Col. 7, line 31, "containeld" should read -- contained --.

Col. 8, line 8, "mostly" should be moved down to the next line adjacent the term "<1" in Col. 8.

Col. 9, line 27, the words "(product phases)" should appear under -- $3TiB_2 + 1.33Al$ --.

Col. 10, line 44, "(product phases)" should appear under -- $2TiB_2 + Al$ --.

Col. 11, line 5, "formesd" should read -- formed --.

Signed and Sealed this

Seventeenth Day of September 1985

[SEAL]

Attest:

DONALD J. QUIGG

Attesting Officer

Commissioner of Patents and
Trademarks—Designate